US006568741B1

(12) United States Patent
Leung et al.

(10) Patent No.: US 6,568,741 B1
(45) Date of Patent: May 27, 2003

(54) DOOR HINGE FOR VEHICLE

(75) Inventors: Kuen Cheuk Leung, Rochester Hills, MI (US); Albert G Lee, Sterling Hts., MI (US); Michael D Kolosick, Roseville, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/185,313

(22) Filed: Jun. 26, 2002

(51) Int. Cl.[7] .................................................. B60J 5/00
(52) U.S. Cl. ........................ 296/146.11; 16/334; 16/335
(58) Field of Search ......................... 296/146.1, 146.11; 16/335, 334

(56) References Cited

U.S. PATENT DOCUMENTS

| | | | | | |
|---|---|---|---|---|---|
| 3,969,789 | A | * | 7/1976 | Wize | 16/334 |
| 4,446,596 | A | * | 5/1984 | Arlauskas | 16/334 |
| 4,532,675 | A | * | 8/1985 | Salazar | 16/335 |
| 4,672,715 | A | * | 6/1987 | Beckwith | 16/334 |
| 4,765,025 | A | * | 8/1988 | Salazar | 16/261 |
| 5,018,243 | A | * | 5/1991 | Anspaugh et al. | 16/335 |
| 5,323,512 | A | * | 6/1994 | Little | 16/334 |
| 5,452,501 | A | * | 9/1995 | Kramer et al. | 16/334 |
| 5,509,175 | A | * | 4/1996 | Baughan et al. | 16/332 |
| 5,570,498 | A | * | 11/1996 | Hipkiss et al. | 16/334 |
| 6,148,481 | A | * | 11/2000 | Chen | 16/334 |

* cited by examiner

*Primary Examiner*—D. Glenn Dayoan
*Assistant Examiner*—Lori L Coletta
(74) *Attorney, Agent, or Firm*—Laura C. Hargitt

(57) ABSTRACT

A door hinge is provided for a door of a vehicle. The door hinge includes a body side hinge strap adapted to be connected to a vehicle body of the vehicle. The door hinge also includes a door side hinge strap adapted to be connected to the door for closing an opening in the vehicle body. The door hinge includes a roller assembly connected to the door side hinge strap. The door hinge further includes a cam pivotally connected to the body side hinge strap and cooperable with the roller assembly, and a spring interconnecting the body side hinge strap and the door side hinge strap to act as an integral check and urge the cam into contact with the roller assembly.

16 Claims, 4 Drawing Sheets

DOOR HINGE FOR VEHICLE

TECHNICAL FIELD

The present invention relates generally to hinges for vehicles and, more particularly, to a door hinge for a vehicle.

BACKGROUND OF THE INVENTION

It is known to provide a door for a vehicle to open and close an opening of a vehicle body of the vehicle. Typically, the door is attached to the vehicle body with at least one, preferably a pair of vertically spaced hinges. Currently, there are door hinges that have a separate check. However, these door hinges do not have a short stand-off or an integral cam. Further, these door hinges typically require maintenance and require extra tooling to hold the door opened during the paint process. Also, these door hinges require reinforcement in the door inner panel and sealing for the check.

Therefore, it is desirable to provide a door hinge for a vehicle that includes a short stand-off. It is also desirable to provide a door hinge for a vehicle that includes an integral check. Therefore, there is a need in the art to provide a door hinge for a vehicle that meets these desires.

SUMMARY OF THE INVENTION

The present invention is a door hinge for a door of a vehicle including a body side hinge strap adapted to be connected to a vehicle body of the vehicle. The door hinge also includes a door side hinge strap adapted to be connected to the door for closing an opening of the vehicle body. The door hinge includes a roller assembly connected to the door side hinge strap. The door hinge further includes a cam pivotally connected to the body side hinge strap and cooperable with the roller assembly, and a spring interconnecting the body side hinge strap and the door side hinge strap to act as an integral check and urge the cam into contact with the roller assembly.

The present invention provides a door hinge having a short stand-off with an integral check for a door of a vehicle. The door hinge allows an integral check to be packaged inside a short stand-off door hinge for a vehicle. The door hinge eliminates the need for a separate check, reducing part count, assembly labor in both the paint and general assembly area. The door hinge eliminates the need for extra tooling to hold the door opened during the paint process. The door hinge eliminates the need for reinforcement in the door inner panel and sealing for the check link. The door hinge has a short stand-off that provides a thinner door (lighter weight and more interior space). The door hinge reduces cost, weight, and labor, while improving design capability and fuel economy. The door hinge has an integral cam, which allows a very tight package that enables the hinge to have a short stand-off. The door hinge incorporates a short-standoff and integral check, which is maintenance free.

DESCRIPTION OF THE PREFERRED EMBODIMENT

Figure 1:
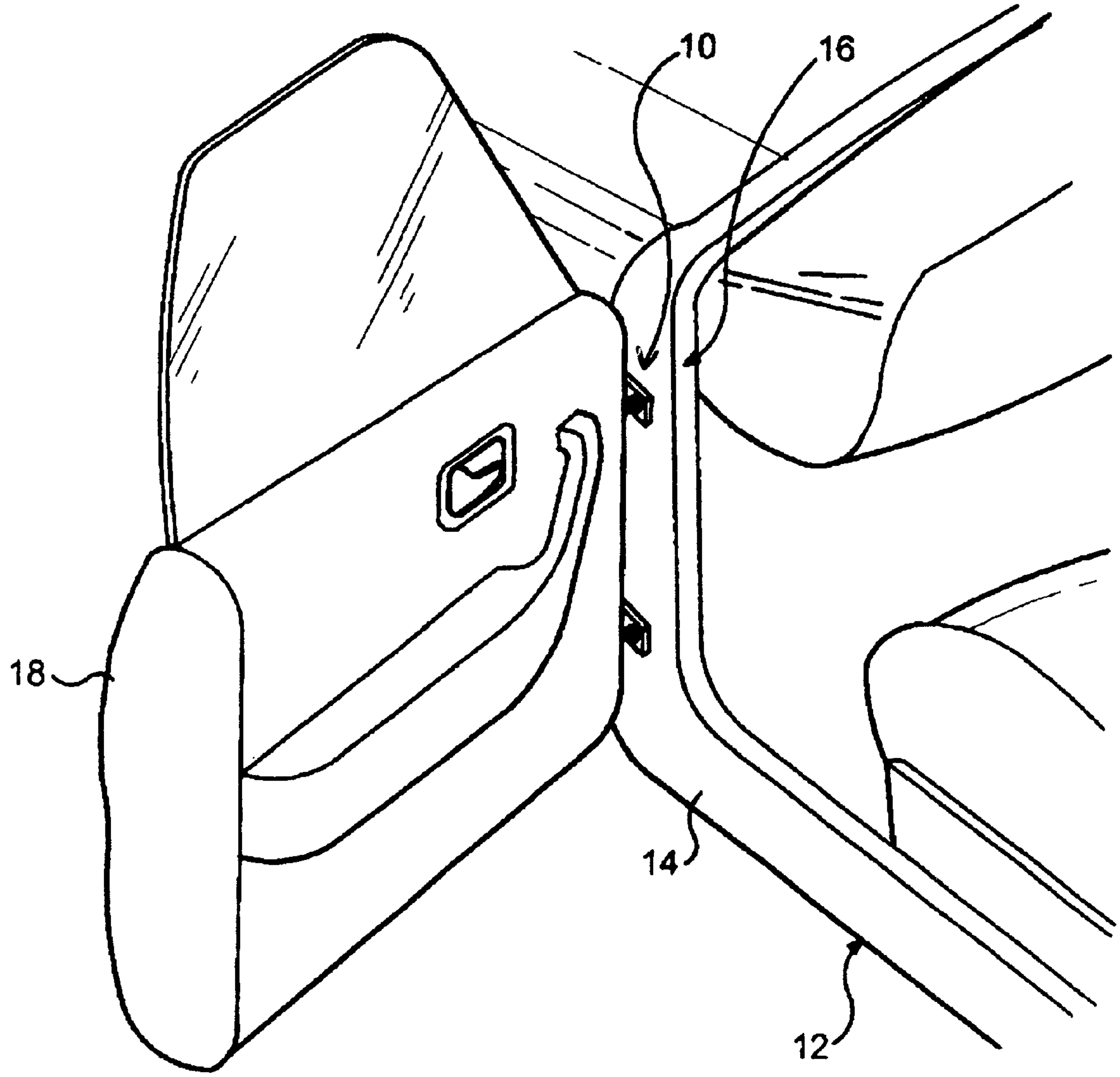
FIG. 1 is a perspective view of a door hinge, according to the present invention, illustrated in operational relationship with a vehicle.

Referring to the drawings and in particular FIG. 1, one embodiment of a door hinge 10, according to the present invention, is shown for a vehicle such as a motor vehicle, generally indicated at 12. Such motor vehicles 12 typically include a vehicle body 14 (partially shown) having an opening 16 in a side thereof. The vehicle body 14 also includes a door 18 for closing the opening 16. The door 18 is attached to the vehicle body 14 by at least one, preferably a pair of vertically spaced door hinges 10, according to the present invention. It should be appreciated that, although two door hinges 10 are illustrated in FIG. 1, only one will be subsequently described. It should also be appreciated that, except for the door hinge 10, the vehicle 12 is conventional and known in the art.

Figure 2:
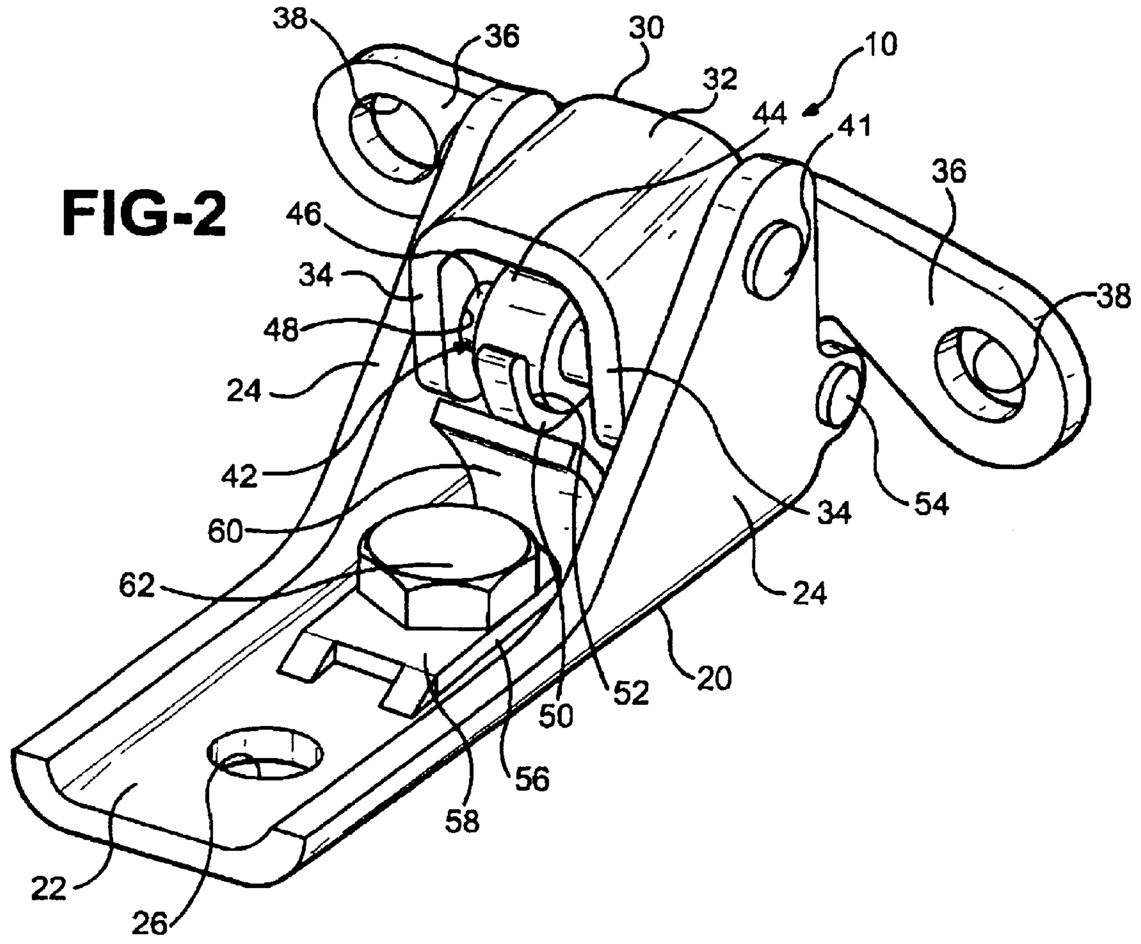
FIG. 2 is a perspective view of the door hinge of FIG. 1.
Figure 3:
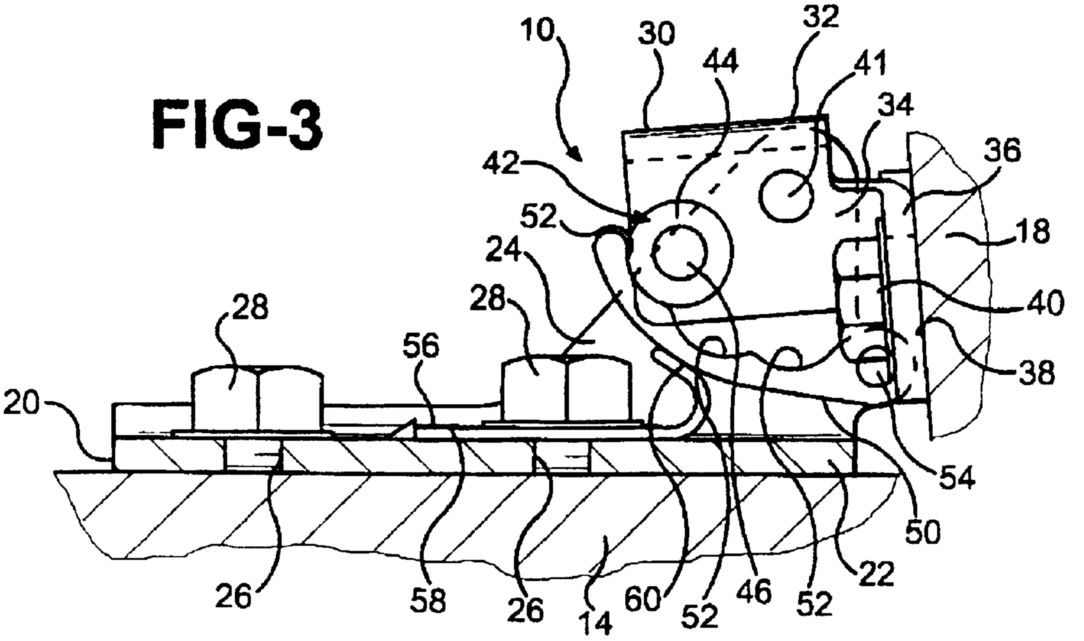
FIG. 3 is a fragmentary elevational view of the door hinge of FIG. 1 in a first operational position.
Figure 4:
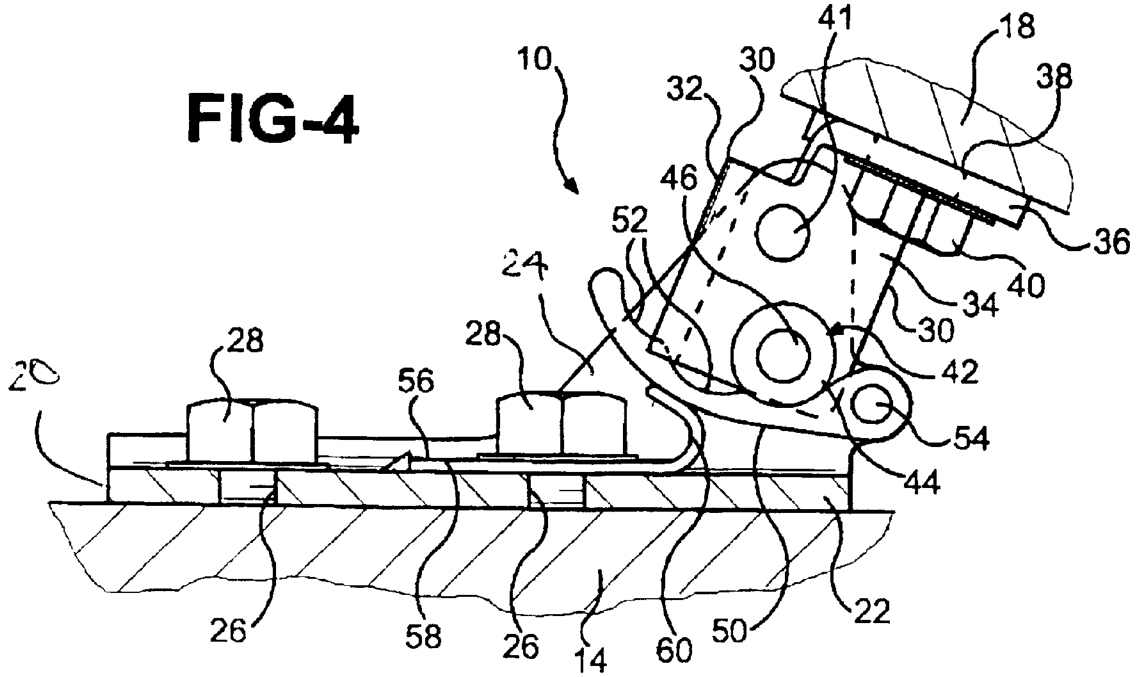
FIG. 4 is a fragmentary elevational view of the door hinge of FIG. 1 in a second operational position.

Referring to FIGS. 2 through 4, the door hinge 10 includes a body side hinge strap 20 to allow the door hinge 10 to be mounted to the vehicle body 14. The body side hinge strap 20 is generally U shaped. The body side hinge strap 20 extends longitudinally and has a base wall 22 and a pair of side walls 24 spaced laterally and extending generally perpendicular to the base wall 22. The base wall 22 has at least one, preferably a plurality of apertures 26 extending therethrough. The door hinge 10 also includes at least one, preferably a plurality of fasteners 28 such as bolts to attach the body side hinge strap 20 to the vehicle body 14. Each of the fasteners 28 may include a washer (not shown) and extend through the apertures 26 and corresponding apertures (not shown) in the vehicle body 14 and are engaged by nuts (not shown) to prevent the fasteners 28 from disengaging the apertures 26. The body side hinge strap 20 is made of a rigid material such as metal. It should be appreciated that the fasteners 28 are conventional and known in the art.

The door hinge 10 also includes a door side hinge strap 30 to allow the door 18 to be attached to the door hinge 10. The door side hinge strap 30 is generally U shaped. The door side hinge strap 30 extends longitudinally and has a base wall 32 and a pair of side walls 34 spaced laterally and extending generally perpendicular to the base wall 32. The door side hinge strap 30 includes a flange 36 extending laterally and generally perpendicular to each side wall 34. Each flange 36 includes an aperture 38 extending therethrough. The door hinge 10 also includes at least one, preferably a plurality of fasteners 40 such as bolts to attach the door side hinge strap 30 to the door 18. Each of the fasteners 40 may include a washer (not shown) and extend through the apertures 38 and corresponding apertures (not shown) in the door 18 and are engaged by nuts (not shown) to prevent the fasteners 40 from disengaging the apertures 38. The door side hinge strap 30 is made of a rigid material such as metal.

It should be appreciated that the fasteners 40 are conventional and known in the art.

The door hinge 10 includes a pin or shaft 41 pivotally connecting the door side hinge strap 30 to the body side hinge strap 20. The pin 41 is generally cylindrical in shape with a generally circular cross-sectional shape. The pin 41 extends laterally through the side walls 34 of the door side hinge strap 30 and the side walls 24 of the body side hinge strap 20. The pin 41 is rotatably secured in place by suitable means such as staking the ends thereof. The pin 41 is made of a rigid material such as metal. It should be appreciated that the pin 41 extends through corresponding apertures (not shown) in the side walls 24 and 34 of the body side hinge strap 20 and door side hinge strap 30, respectively.

The door hinge 10 also includes a roller assembly, generally indicated at 42, to act as an integral check for the door hinge 10. The roller assembly 42 includes a roller member 44 disposed between the side walls 34 of the door side hinge strap 30. The roller member 44 is generally circular in shape. The roller assembly 42 also includes a pin or shaft 46 extending laterally through the roller member 44 and the side walls 34 of the door side hinge strap 30. The shaft 46 is rotatably secured in place by suitable means such as staking the ends thereof. The shaft 46 is made of a rigid material such as metal. It should be appreciated that the shaft 46 extends through apertures 48 in the side walls 34 of the door side hinge strap 30. It should also be appreciated that the roller member 44 is fixed relative to the shaft 46 and that the shaft 46 rotates relative to the side walls 34.

The door hinge 10 includes a cam 50 disposed between the side walls 24 of the body side hinge strap 20 for cooperating with the roller assembly 42. The cam 50 is generally arcuate in shape. The cam 50 has at least one, preferably a plurality of, more preferably three, recesses or depressions 52 forming cam surfaces along a side facing the roller member 44 for cooperating with the roller member 44. The recesses 52 are generally arcuate in shape to receive the roller member 44 in predetermined positions. The door hinge 10 also includes a pin or shaft 54 extending laterally through the cam member 44 at one end thereof and the side walls 24 of the body side hinge strap 20. The shaft 54 is rotatably secured in place by suitable means such as staking the ends thereof. The shaft 54 is made of a rigid material such as metal. It should be appreciated that the shaft 54 extends through apertures 48 in the side walls 24 of the body side hinge strap 20. It should also be appreciated that the cam 50 is fixed relative to the shaft 54 and that the shaft 54 rotates relative to the side walls 24.

The door hinge 10 further includes a spring 56 to urge the cam 50 toward the roller member 44 and keep the cam 50 in contact with the roller member 44. The spring 56 is of a leaf type. The spring 56 has a base wall 58 that is generally planar and rectangular in shape to contact the base wall 22 of the body side hinge strap 20. The spring 56 also includes an end wall 60 extending upwardly from one end of the base wall 60. The end wall 60 is generally arcuate in shape to contact the cam 50. The spring 56 includes an aperture 62 extending through the base wall 58 to allow one of the fasteners 28 to extend therethrough. The spring 56 is made of a spring material such as metal. It should be appreciated that the end wall 60 flexes or deflects when the roller member 44 engages the cam 50.

In operation of the door hinge 10, when the door 18 is opening, the roller assembly 42 that is attached to the door side hinge strap 30 rolls along the cam 50. The spring 56 keeps the cam 50 in contact with the roller member 44 of the roller assembly 42 at all times. The recesses 52 on the cam 50 keep the door open in those predetermined positions. To open or close the door 18, the user must exert a force on the door 18 that can override the force of the spring 56. It should be appreciated that the door hinge 10 allows the door 18 to be rotated open and closed as illustrated in FIGS. 3 and 4.

Figure 5:
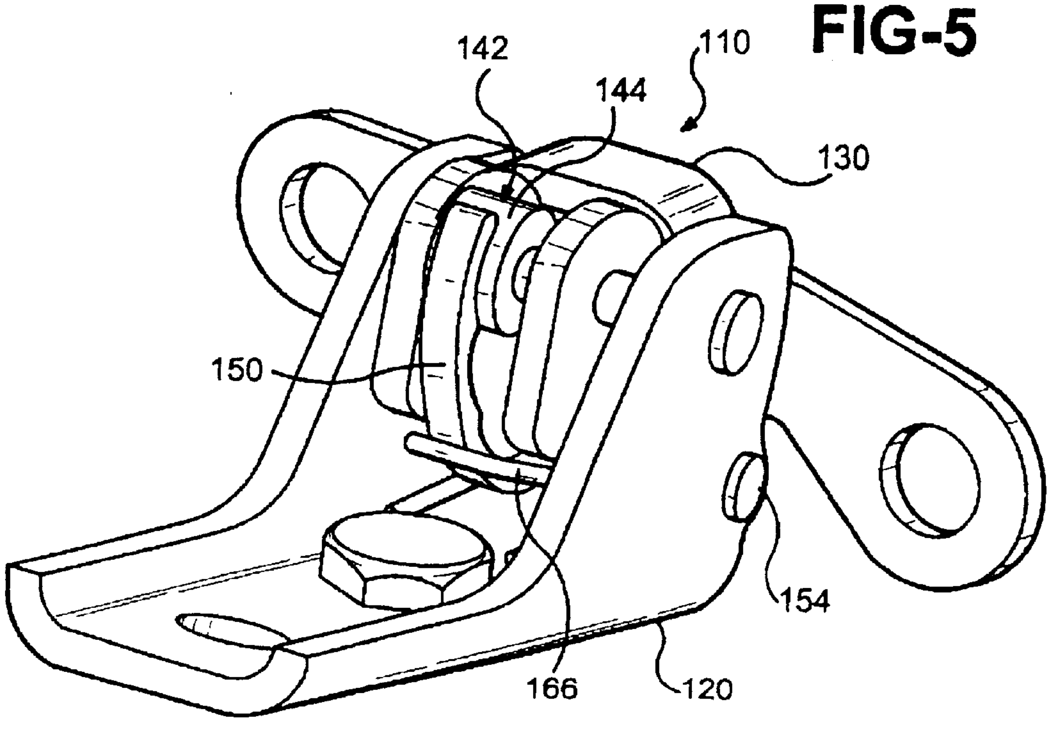
FIG. 5 is a perspective view of another embodiment, according to the present invention, of the door hinge of FIG. 1.
Figure 6:
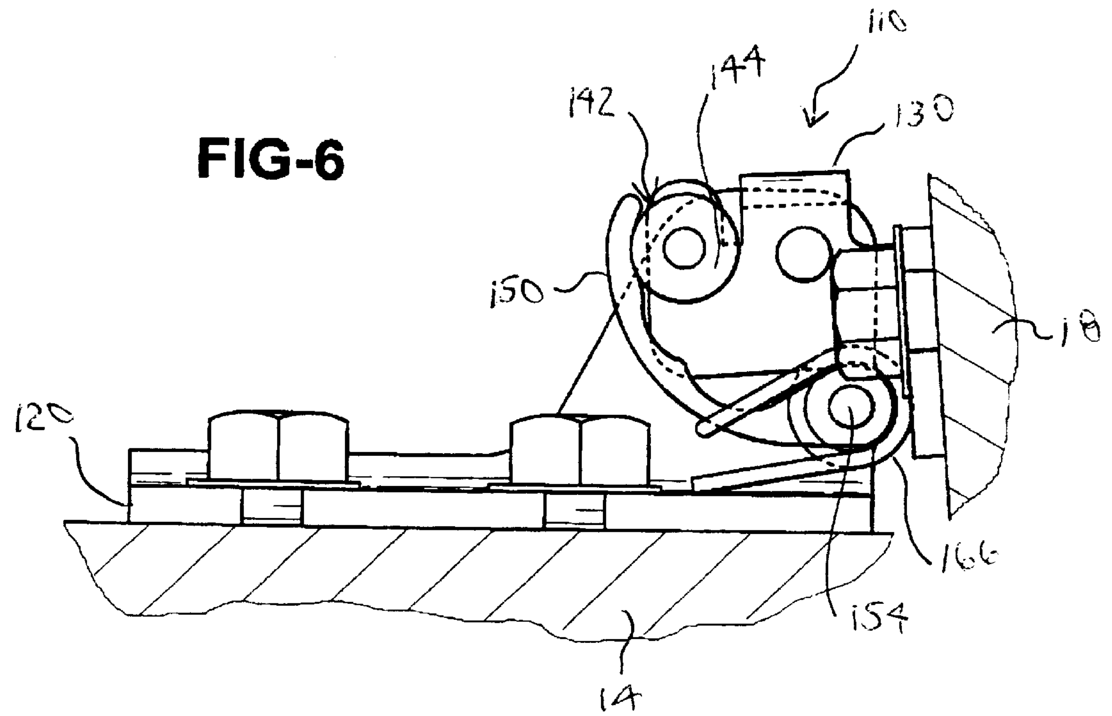
FIG. 6 is a fragmentary elevational view of the door hinge of FIG. 5 in a first operational position.
Figure 7:
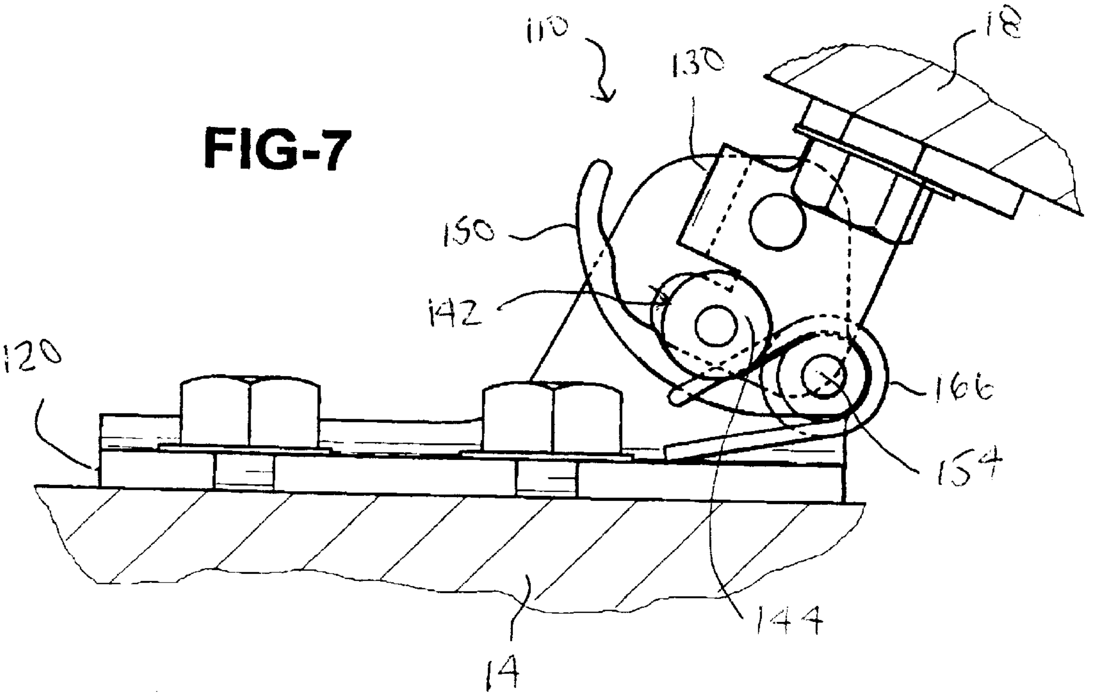
FIG. 7 is a fragmentary elevational view of the door hinge of FIG. 5 in a second operational position.

Referring to FIGS. 5 through 7, another embodiment, according to the present invention, of the door hinge 10 is shown. Like parts of the door hinge 10 have like reference numerals increased by one hundred (100). In this embodiment, the door hinge 110 replaces the leaf type spring 56 with a torsional type spring 166. The spring 166 has a coiled shape and is disposed about the shaft 154. The spring 166 has one end contacting the base wall of the body side hinge strap 120 and another end connected to the shaft 154 by suitable means such as welding. The spring 166 is made of a spring material such as metal. It should be appreciated that the spring 166 provides a force to the shaft 154 to urge the cam 150 toward the roller member 144 of the roller assembly 142 and keep the cam 150 in contact with the roller member 144 at all times. The operation of the door hinge 110 is similar to the door hinge 10. It should be appreciated that the door hinge 110 allows the door 18 to be rotated open and closed as illustrated in FIGS. 6 and 7.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A door hinge for a door of a vehicle comprising:

a body side hinge strap adapted to be connected to a vehicle body of the vehicle;

a door side hinge strap adapted to be connected to the door for closing an opening in the vehicle body;

a roller assembly connected to said door side hinge strap;

a cam pivotally connected to said body side hinge strap and cooperable with said roller assembly; and a spring being one of a torsional type and a leaf type operatively connected to said body side hinge strap to act as an integral check and urge said cam into contact with said roller assembly.

2. A door hinge as set forth in claim 1 wherein said roller assembly comprises a roller member and a first shaft extending through said roller member and connected to said door side hinge strap.

3. A door hinge as set forth in claim 2 wherein said cam includes a plurality of recesses for receiving said roller member in predetermined positions.

4. A door hinge as set forth in claim 2 including a second shaft extending through said cam and connected to said body side hinge strap.

5. A door hinge as set forth in claim 4 wherein said spring is disposed about said second shaft.

6. A door hinge as set forth in claim 1 wherein said spring has a base wall and an end wall extending upwardly from said base wall and contacting said cam.

7. A door hinge as set forth in claim 1 including a pin for pivotally connecting said door side hinge strap to said body side hinge strap.

8. A door hinge as set forth in claim 1 including fasteners for fastening said body side hinge strap to the vehicle body and said door side hinge strap to the door.

9. A door hinge for a door of a vehicle comprising:

a body side hinge strap adapted to be connected to a vehicle body of the vehicle;

a door side hinge strap adapted to be connected to the door for closing an opening in the vehicle body;

a pin for pivotally connecting said door side hinge strap to said body side hinge strap;

a roller assembly connected to said door side hinge strap;

a cam pivotally connected to said body side hinge strap and cooperable with said roller assembly; and a spring being one of a torsional type and a leaf type operatively connected to said body side hinge strap to act as an integral check and urge said cam into contact with said roller assembly.

10. A door hinge as set forth in claim 9 wherein said roller assembly comprises a roller member and a first shaft extending through said roller member and connected to said door side hinge strap.

11. A door hinge as set forth in claim 10 wherein said cam includes a plurality of recesses for receiving said roller member in predetermined positions.

12. A door hinge as set forth in claim 9 including a second shaft extending through said cam and connected to said body side hinge strap.

13. A door hinge as set forth in claim 12 wherein said spring is disposed about said second shaft.

14. A door hinge as set forth in claim 9 wherein said spring has a base wall and an end wall extending upwardly from said base wall and contacting said cam.

15. A door hinge as set forth in claim 9 including fasteners for fastening said body side hinge strap to the vehicle body and said door side hinge strap to the door.

16. A door assembly of a vehicle comprising:

a vehicle body having an opening extending therethrough;

a door for opening and closing said opening; and at least one door hinge interconnecting said vehicle body and said door, said at least one door hinge comprising a body side hinge strap connected to said vehicle body, a door side hinge strap connected to said door, a pin pivotally connecting said door side hinge strap to said body side hinge strap, a roller assembly connected to said door side hinge strap, a cam pivotally connected to said body side hinge strap and cooperable with said roller assembly, and a spring being one of a torsional type and a leaf type operatively connected to said body side hinge strap to act as an integral check and urge said cam into contact with said roller assembly.

* * * * *